No. 613,712. Patented Nov. 8, 1898.
J. W. PARKIN.
BALL BEARING PULLEY.
(Application filed Aug. 19, 1897.)
(No Model.)

WITNESSES
P. H. Cragle.
M. G. Lukens.

INVENTOR.
Joseph W. Parkin.
BY Wiedersheim & Fairbanks.
ATTORNEYS

THE NORRIS PETERS CO., PHOTO-LITHO., WASHINGTON, D. C.

UNITED STATES PATENT OFFICE.

JOSEPH W. PARKIN, OF PHILADELPHIA, PENNSYLVANIA.

BALL-BEARING PULLEY.

SPECIFICATION forming part of Letters Patent No. 613,712, dated November 8, 1898.

Application filed August 19, 1897. Serial No. 648,807. (No model.)

*To all whom it may concern:*

Be it known that I, JOSEPH W. PARKIN, a citizen of the United States, residing in the city and county of Philadelphia, State of Pennsylvania, have invented a new and useful Ball-Bearing Pulley, of which the following is a specification.

My invention consists of an improved construction of ball-bearing pulley in which friction is reduced to a minimum and other advantages are attained, all as will be hereinafter fully set forth, and particularly pointed out in the claims. I attain these objects by the mechanism illustrated in the accompanying drawings, in which—

Figure 1:
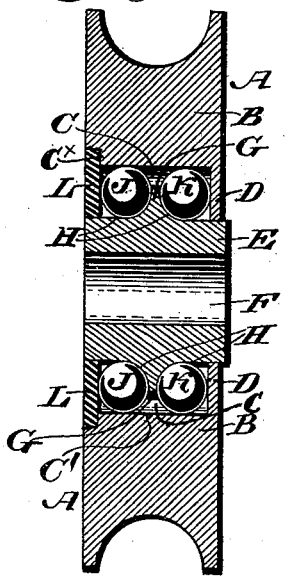
Figure 2:
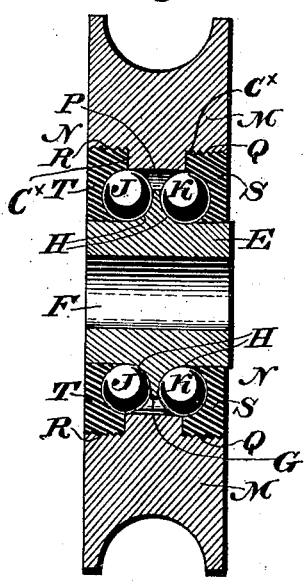
Figure 3:
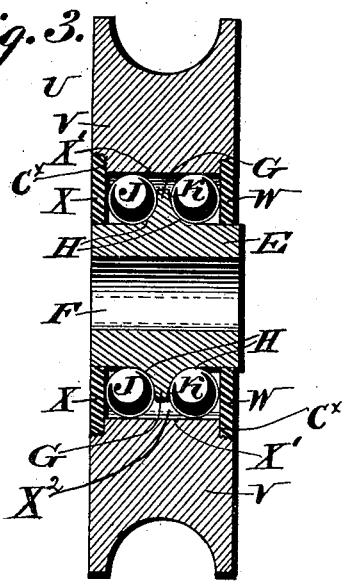

Figures 1, 2, and 3 represent sectional views of ball-bearing pulleys embodying my invention.

Similar letters refer to similar parts throughout the several views.

Referring to the drawings, A designates a ball-bearing pulley, the same consisting of the body portion B, which has the inwardly-extending portion C′, with shoulder $C^X$ and the recess or cavity C therein, the latter being closed at one end in Fig. 1 by the wall D. E designates a core or bushing, which is located in said cavity and has the opening F therethrough, said bushing having the exterior peripheral web G, the outer walls of which are rounded to form the bearings H, upon which are seated the balls J and K, respectively, the balls K being held between a side of the web G and the wall D, while the balls J are held between the opposite side of said web, a wall of the recess C, and the washer or ball-retainer L, which is screwed into the body portion B and adapted to contact with said balls J.

In the construction seen in Fig. 2, N designates the parts in assembled position, the same consisting of the body M, which has the threaded recesses Q and R, whereby the inwardly-projecting portion P is formed, the balls J and K being held between the curved walls H of the bushing E and the contiguous curved faces of the washers or ball-retainers S T. In this form there are two shoulders $C^X$, one on each side, against which the washers engage.

In the construction seen in Fig. 3 the pulley U consists of the body portion V, having the washers or ball-retainers X and W screwed thereinto, said pulley having the shoulders $C^X$, inwardly-extending portion X′, and bore $X^2$, the bore extending therethrough, while the balls J and K are held between the curved faces H, ball-retainers W X, and the wall of the bore.

It will be noted that in each instance I employ a bushing or core E, the latter being held in position by means of the balls and washers and the adjacent contacting wall of the body portion of the pulleys, respectively.

It will be seen from the foregoing that the parts may be readily assembled and disconnected, according to requirements, and that the pulley can be cheaply manufactured.

Having thus described my invention, what I claim as new, and desire to secure by Letters Patent, is—

1. In a ball-bearing pulley, a body with inwardly-projecting portion, a bushing with peripheral web having recessed sides, antifriction-balls upon opposite sides of said web, a ball-retaining washer removably secured to the body and engaging the balls upon one side of said web, and means on the opposite side of said body for retaining the other set of balls in position.

2. A pulley-body having a central opening and an inwardly-projecting portion, a hub or bushing provided with a peripheral web having rounded sides, washers bearing against said portion and having curved inner faces, said washers being in engagement with said body, and antifriction-balls held intermediate said washers and the rounded sides of said web.

3. A pulley-body having a central opening and an inwardly-projecting portion, a hub or bushing provided with a peripheral web having rounded sides, antifriction-balls upon opposite sides of said web, and ball-retaining washers bearing against said portion and engaging said body and retaining the balls between the web and washers.

JOSEPH W. PARKIN.

Witnesses:
JOHN A. WIEDERSHEIM,
E. HAYWARD FAIRBANKS.